(12) United States Patent
Chaudhari et al.

(10) Patent No.: US 7,162,641 B1
(45) Date of Patent: Jan. 9, 2007

(54) WEIGHT BASED BACKGROUND DISCRIMINANT FUNCTIONS IN AUTHENTICATION SYSTEMS

(75) Inventors: Upendra V. Chaudhari, Elmsford, NY (US); Stephane H. Maes, Danbury, CT (US); Jiri Navratil, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 09/592,310

(22) Filed: Jun. 13, 2000

(51) Int. Cl.
*H04K 1/00* (2006.01)
*H04L 9/00* (2006.01)
*G10L 15/00* (2006.01)
*G10L 17/00* (2006.01)

(52) U.S. Cl. .................. 713/186; 726/21; 704/246
(58) Field of Classification Search ........... 704/270, 704/273, 256, 246, 249; 713/182, 186; 726/21
See application file for complete search history.

(56) References Cited

U.S. PATENT DOCUMENTS

| | | | | |
|---|---|---|---|---|
| 5,719,950 | A * | 2/1998 | Osten et al. ............. | 382/115 |
| 5,913,192 | A * | 6/1999 | Parthasarathy et al. .. | 704/256.1 |
| 5,913,196 | A * | 6/1999 | Talmor et al. ........... | 704/270 |
| 6,070,159 | A * | 5/2000 | Wilson et al. ........... | 707/3 |
| 6,154,579 | A * | 11/2000 | Goldberg ................ | 382/310 |
| 6,160,903 | A * | 12/2000 | Hamid et al. ........... | 382/115 |
| 6,185,316 | B1 * | 2/2001 | Buffam ................... | 382/115 |
| 6,233,555 | B1 * | 5/2001 | Parthasarathy et al. .... | 704/249 |
| 6,259,805 | B1 * | 7/2001 | Freedman et al. ....... | 382/124 |
| 6,266,640 | B1 * | 7/2001 | Fromm .................... | 704/273 |
| 6,330,536 | B1 * | 12/2001 | Parthasarathy et al. .... | 704/249 |
| 6,356,868 | B1 * | 3/2002 | Yuschik et al. ......... | 704/246 |
| 6,493,669 | B1 * | 12/2002 | Curry et al. ............ | 704/257 |
| 6,510,415 | B1 * | 1/2003 | Talmor et al. ........... | 704/273 |
| 6,655,585 | B1 * | 12/2003 | Shinn .................... | 235/382 |
| 6,697,947 | B1 * | 2/2004 | Matyas et al. .......... | 713/182 |
| 6,754,628 | B1 * | 6/2004 | Chaudhari et al. ...... | 704/246 |
| 6,792,083 | B1 * | 9/2004 | Dams et al. ............. | 379/88.01 |

OTHER PUBLICATIONS

Keiichi Tokuda et al. Recursive Calculation of Mel-Cepstrum from LP Coefficients. Apr. 1, 1994. Tokyo Institute of Technology. p. 1-7.*
S. Maes, "Conversational Biometrics", Proc. of the European Conference on Speech Communication and Technology (EUROSPEECH '99), Budapest, Hungary, 1999.

* cited by examiner

*Primary Examiner*—Christopher Revak
*Assistant Examiner*—Christian LaForgia
(74) *Attorney, Agent, or Firm*—Ference & Associates

(57) ABSTRACT

Methods and apparatus for providing speech-based authentication, including the determination of a target discriminant based on an identity claim and on at least one target voiceprint model relating to a target speaker, of a background discriminant based on the identity claim and on at least one background voiceprint model relating to at least one background speaker, and of a score based on the target discriminant and the background discriminant, which score is used to accept or reject the identity claim.

17 Claims, 4 Drawing Sheets

WEIGHT BASED BACKGROUND DISCRIMINANT FUNCTIONS IN AUTHENTICATION SYSTEMS

FIELD OF THE INVENTION

The present invention generally relates to identification, such as voice-based authentication, of an individual's identity.

BACKGROUND OF THE INVENTION

When authenticating an individual's identity via an individual's voice, a general objective is to decide, when given an identity claim (e.g. a name), whether the speech data of the user making the claim matches the voiceprint (data model) of the claimant (target) better than data models of the background population. To support this capability, the claimant must be enrolled in the system. Some possible applications for voice authentication, among others, are for verification purposes for gaining access to a locked door, access to an automatic teller machine, or generally for obviating the use of physical keys or passwords (though it should be noted that keys or passwords may still be used in conjunction with the methods described herein) or for enrolling a voice in a database in similar contexts. An example of conventional voice authentication is described in "Conversational Biometrics" (S. H. Maes, EURO-SPEECH99).

Normally, speech data is collected by the data collection agent which performs the necessary data analysis and passes the resulting feature set to the modeling or testing agents depending on whether the desired operation is enrollment or verification. (See FIG. 1). However, previous efforts have generally failed to undertake voice-based authentication in a manner that provides the degree of accuracy and effectiveness often sought.

Thus, a need has been recognized in connection with providing an improved approach to such voice-based authentication.

SUMMARY OF THE INVENTION

In accordance with at least one presently preferred embodiment of the present invention, authentication is carried out as a two-class hypothesis test. The two classes are "target" and "background", the former referring to data and/or characteristics relating to a speaker whose voice is to be authenticated and the latter referring to data and/or characteristics relating to at least one other speaker against which the "target" data and/or characteristics may be compared. The present invention broadly contemplates, in accordance with at least one presently preferred embodiment, using more than one background model in determining the background discriminant, whereas previous efforts have typically focused on using only one background model.

Other aspects and refinements of the present invention, in accordance with at least one presently preferred embodiment, will become apparent from the detailed discussion further below.

In one aspect, the present invention provides a method of providing authentication, the method comprising the steps of: receiving an identity claim; determining a target discriminant based on the identity claim and on at least one target model relating to a target individual; determining a background discriminant based on the identity claim and on at least one background model relating to at least one background individual; determining a score based on the target discriminant and the background discriminant; and accepting or rejecting the identity claim based on the determined score.

In another aspect, the present invention provides a method of providing speech-based authentication, the method comprising the steps of: receiving an identity claim; determining a target discriminant based on the identity claim and on at least one target voiceprint model relating to a target speaker; determining a background discriminant based on the identity claim and on at least one background voiceprint model relating to at least one background speaker; determining a score based on the target discriminant and the background discriminant; and accepting or rejecting the identity claim based on the determined score.

In a further aspect, the present invention provides an apparatus for providing authentication, the apparatus comprising: a receiving arrangement which receives an identity claim; a target discriminant generator which determines a target discriminant based on the identity claim and on at least one target model relating to a target individual; a background discriminant generator which determines a background discriminant based on the identity claim and on at least one background model relating to at least one background individual; and a decision arrangement which determines a score based on the target discriminant and the background discriminant, and accepts or rejects the identity claim based on the determined score.

In an additional aspect, the present invention provides, an apparatus for providing speech-based authentication, the apparatus comprising: a receiving arrangement which receives an identity claim; a target discriminant generator which determines a target discriminant based on the identity claim and on at least one target voiceprint model relating to a target speaker; a background discriminant generator which determines a background discriminant based on the identity claim and on at least one background voiceprint model relating to at least one background speaker; and a decision arrangement which determines a score based on the target discriminant and the background discriminant, and accepts or rejects the identity claim based on the determined score.

Furthermore, the present invention provides in another aspect a program storage device readable by machine, tangibly embodying a program of instructions executable by the machine to perform method steps for providing authentication, the method comprising the steps of: receiving an identity claim; determining a target discriminant based on the identity claim and on at least one target model relating to a target individual; determining a background discriminant based on the identity claim and on at least one background model relating to at least one background individual; determining a score based on the target discriminant and the background discriminant; and accepting or rejecting the identity claim based on the determined score.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
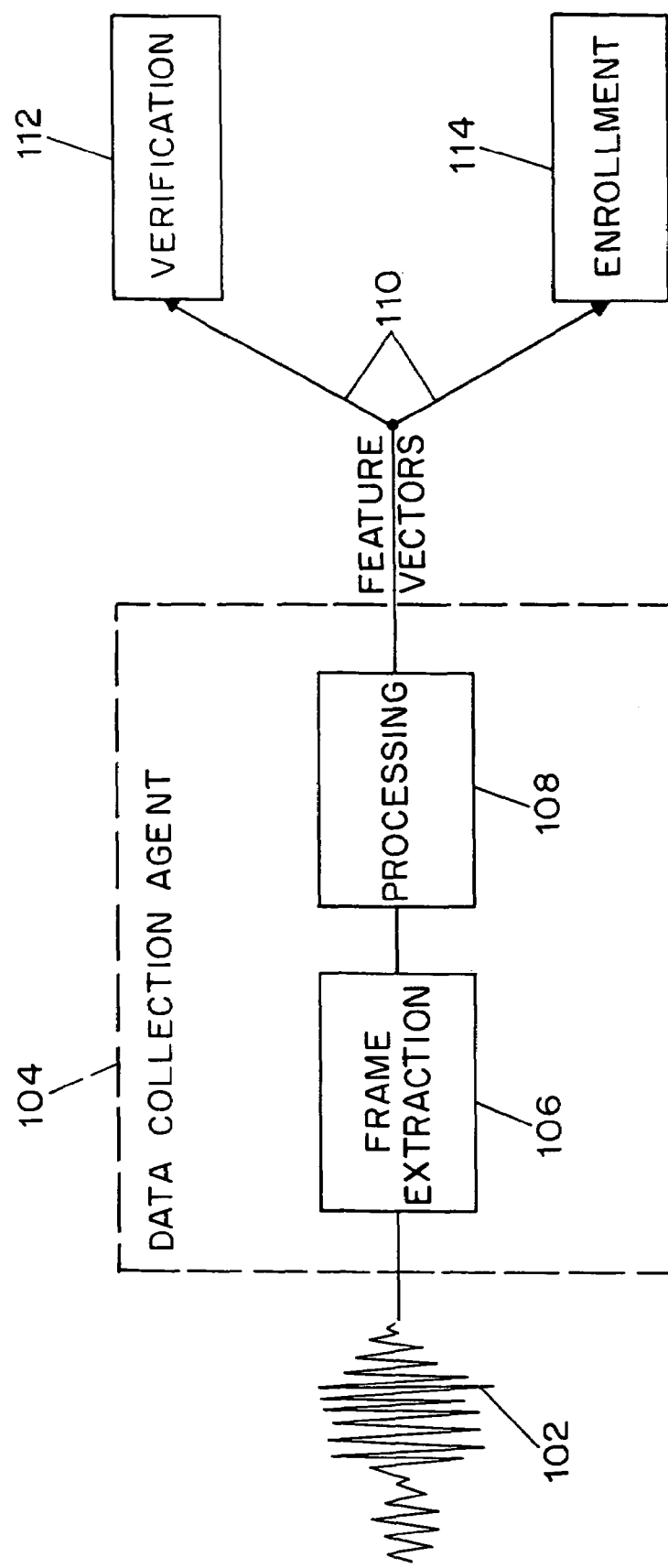
FIG. 1 schematically illustrates initial data processing in an authentication system.

FIG. 1 generally illustrates an authentication system and its characteristic components. Speech data 102 is preferably collected by a data collection agent 104, which itself includes arrangements for frame extraction (106) and processing (108). The feature vectors that result (110) are then processed further, either for verification (112) or enrollment (114). Enrollment is the process by which the statistical properties of a given target's training speech data are gathered and modeled. The particulars of enrollment are well-documented and can be found, for example, in the copending and commonly assigned U.S. patent application entitled "Speaker Recognition Method Based on Structured Speaker Modeling and a 'Pickmax' Scoring Technique" (U. Chaudhari et al.), filed herewith and assigned application Ser. No. 09/593,275.

Figure 2:
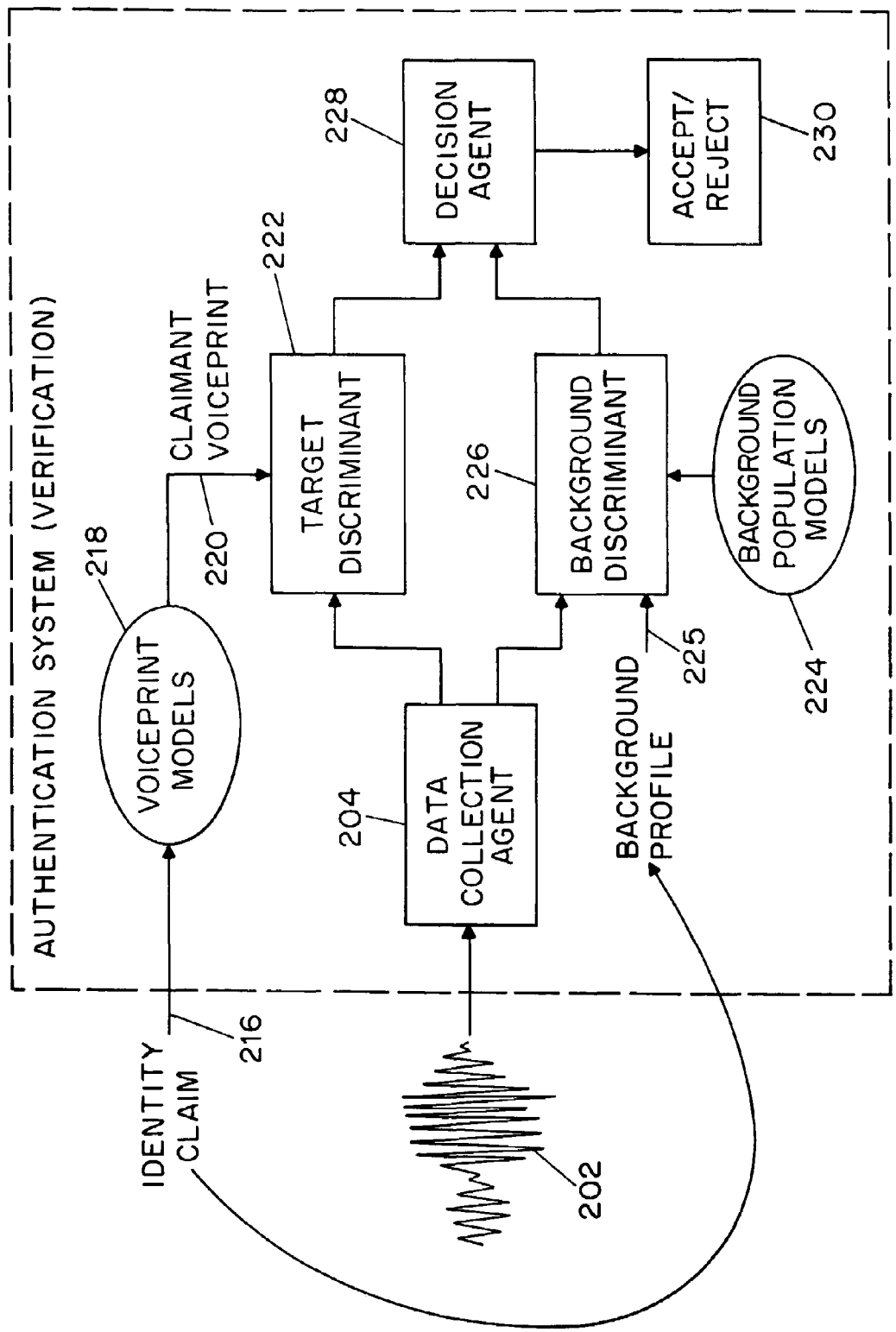
FIG. 2 is a block diagram of a verification process in authentication.
Figure 3:
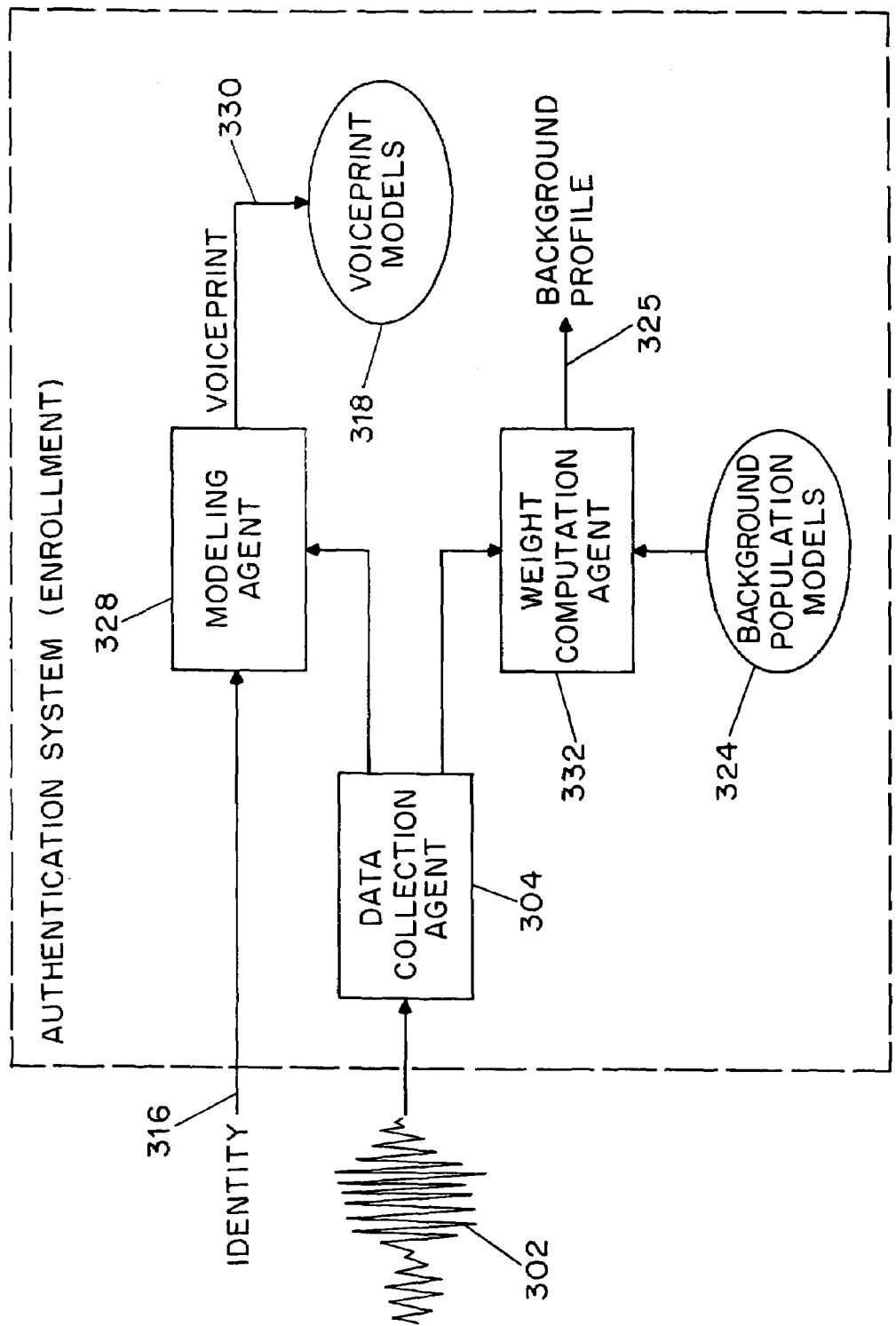
FIG. 3 is a block diagram of an enrollment process in authentication.

As stated above, in accordance with at least one presently preferred embodiment of the present invention, authentication is preferably carried out as a two-class (target and background) hypothesis test. Input for rendering a final decision (on the authenticity of an identity claim) is preferably in the form of a real-valued function assigned to each class (a "discriminant"), along with processed speech data. The contemplated technique will preferably be independent of the particular processing used. FIG. 2, thus, shows a block diagram illustrating a verification process while FIG. 3 illustrates a contemplated enrollment process.

Preferably, for both the target discriminant and the background discriminant, higher values will indicate better matches of the test speech with respect to the voiceprint and background population models being compared against. In at least one embodiment of the present invention, both of the (target and background) discriminant functions depend on the claimed identity. In addition, the background class discriminant may depend on an automatically generated background profile.

As shown in FIG. 2 (i.e., the "verification" block diagram), speech data 202 may preferably be input into a data collection agent 204 per usual. From this, however, the hypothesis test preferably proceeds in two classes such that a target discriminant is calculated at 222 while a background discriminant is calculated at 226. As input for determining the target discriminant at 222, the identity claim being made (at 216, e.g., in the form of an individual uttering a name, or via essentially any other mechanism to provide an identity claim [e.g., an ID keyed on a phone or ATM, or passed on by the rest of the business logic in question]) is used to extract from voiceprint models 218 the corresponding voiceprint 220.

In contrast to previous efforts, however, it is not the case that just one global voiceprint is assigned to the background. Rather, the discriminant for the background class is preferably a target-dependent function of individual voiceprint-based discriminants in the background population, which individual discriminants are inherent in background population models 224. Thus, several background population models 224 preferably assist in serving as input into the background discriminant function, as well as weights (inherent in a background profile 225) that will be appreciated from the equations herebelow. Because the presently contemplated embodiment is based on speech (as opposed to, for instance, fingerprints or facial characteristics), the data models used (218, 224) are chosen to capture a speaker's characteristics. Thus, the presently contemplated embodiment relates to speaker recognition. In this case, the "biometrics" are voice prints that characterize or model the voice of speakers. When other bioemtrics are used, it will be understood that the models of the users are to be chosen to characterize the corresponding biometric. The speech-related method described here can thus be extended to other biometrics.

In accordance with at least one presently preferred embodiment of the present invention, use is made of a sequence of Mel-frequency cepstral vectors $\{x_t\}$ in $R^n$ as the basic representation of training and testing data. To this, delta-cepstra parameters are preferably added, which have proven to be effective in the text-independent setting. In order to mitigate the effects of channel interference, cepstral mean subtraction is preferably used. Further, the voiceprint models $M_{j,\{T^j\}}^j$ are preferably denoted by $\{T_k^j m_{k,i}, T_k^j \Sigma_{k,i}, T_k^{j\,t}, p_{k,i}\}$. This model is a set of Gaussian mixture models with k indicating the mixture and i indicating the component in the mixture. The specific form of this model can be found in U. Chaudhari et al., supra.

In accordance with at least one embodiment of the present invention, enrollment (FIG. 3) preferably involves constructing a voiceprint for the target (330) along with an associated target dependent background profile 325 which adapts the background population to the target. Background profile 325 is preferably constructed by assigning a number to the relative importance of every background model based on its similarity to the target The specific method used in connection with speech is described in detail later.

The target discriminant function will preferably be given directly by the voiceprint 330, while the background profile will be used subsequently to construct a target dependent background discriminant function.

Some more detailed aspects of at least one embodiment of the present invention will now be discussed, with reference being made to both FIGS. 2 and 3 simultaneously unless otherwise noted.

Given a set of vectors X in $R^n$, the likelihood based discriminant function for any individual target (or background) model (222, 226) is preferably:

$$D(X|M^j_{\{T^j\}}) = \Sigma_{x \in X} \max_k \log[\max_i p^j_{k,i} p(T_k^j x | T_i^k m^j_{k,i}, T_{k,i}^j \Sigma^j_{k,i}, T_k^{j\,t})]$$

The form of this function is a subject of the aforementioned patent application (U. Chaudhari et al.) and serves here as an example. However, any other suitable discriminant functions may be used at this point.

Preferably, the first step in constructing the background functions 226 is to individually model the enrollment data of each background speaker with a voiceprint. This is inherent in the "background population models" indicated at 224 (i.e., before any target is enrolled, each background speaker is enrolled according to the target discriminant path through 222, and then all of the background models are then stored in 224). Thus, contemplated herein is a set of procedures to generate a variety of discriminant functions for a background reference population. One may be termed the Enforced (or adjustable) method, the purpose of which is to guarantee consistent behavior and performance over all of the target speaker population. The other may be termed the Automatic (or adaptive) method, which determines (possibly dynamically) the function based on the set of background discriminant scores.

As to the background discriminant function, let $M_{BG}$ denote the set of voiceprints. Without loss of generality, let there be $N_{BG}$ background models and let $M_{BG}$ be a vector of all of the individual background model discriminant functions arranged in some order. Note that these functions are the same as the target function described above.

The background discriminant is defined by $M_{BG}$ together with a $N_{BG} \times N_{BG}$ permutation matrix $P^j$ and a $N_{BG} \times 1$ weight vector $W^j$. The superscript indicates that these last two are target dependent. $P^j$ and $W_j$ constitute the background profile mentioned earlier. $W^j$ alone may also be referred to as the profile or weight profile. In this case $P^j$ will be given with the identity matrix.

Given test data for target j (i.e. the identity claim j along with validation data) the background model discriminant function score is preferably defined as $$MB_{BG}P^jW^j(X). \tag{1}$$

Recall that $M_{BG}$ is a vector valued function of X. Thus equation 1 is a scalar valued equation.

Figure 4:
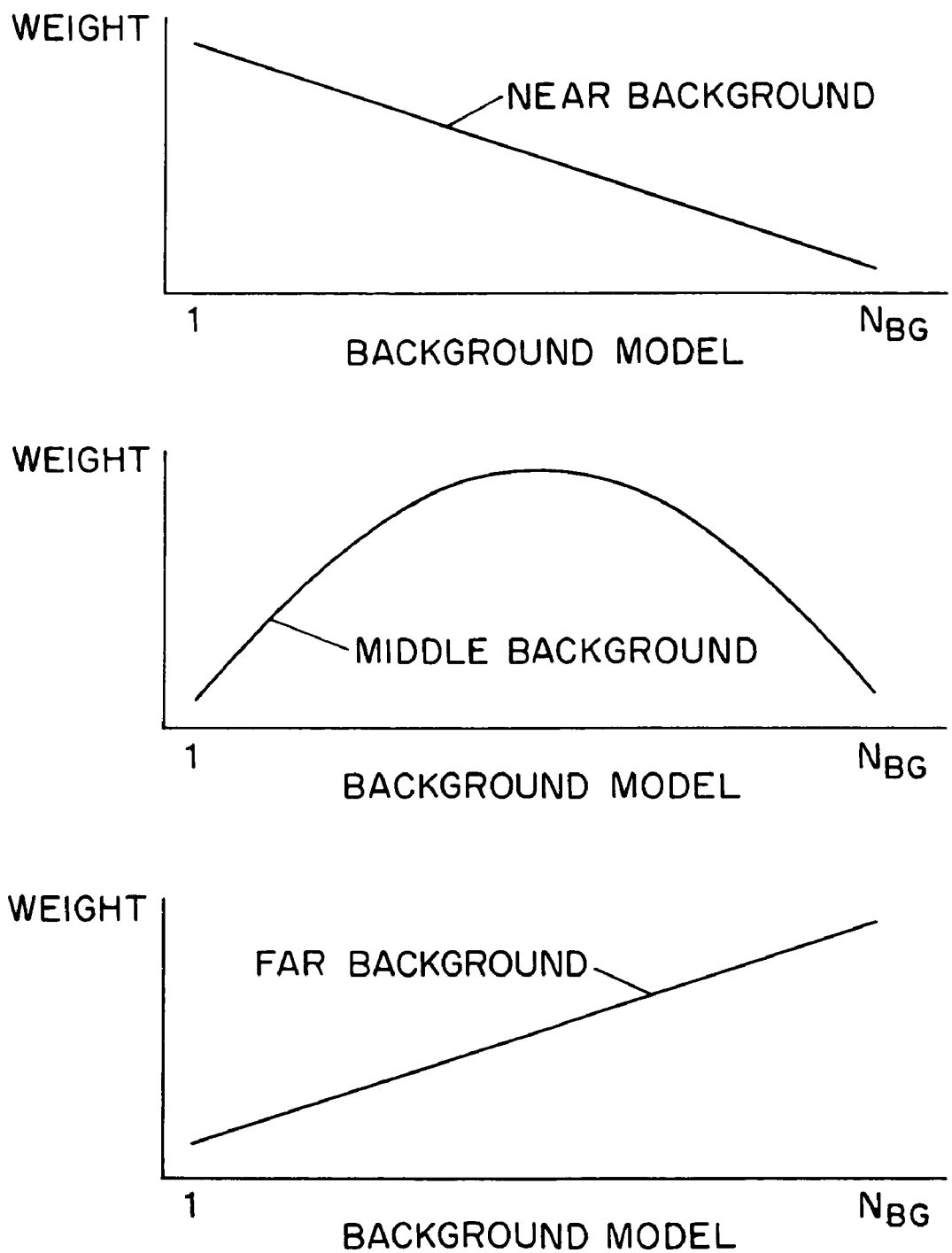
FIG. 4 illustrates various weight vectors that may be utilized.

As to the Enforced method, the specification of $P^j$ and $W^j$ permits the meaning of the profile to be assigned and varied. As a non-restrictive example, one may consider the following. Let $P^j$ be defined so that $M_{BG}P^j$ is sorted such that in the resulting vector, the background discriminant function in the first position is the one with the highest value on the training data, $X_j$, for target speaker j. The corresponding values will decrease monotonically to the end of the vector. Next one may consider the weight graphs shown in FIG. 4. Selecting one of these allows us to define background discriminant functions with specific properties with respect to a given target model. For example, using the "Middle Background" profile allows one to compare essentially any target to models which represent the "average" population with respect to the target (i.e. speakers that are not too close or too far), thus allowing the technique to better match the training data. If the weighting were static (with respect to target variation), such a claim could not be made. Similar effects can be created by using the other profiles shown, or for that matter, any other profile. The important point is that the same behavior across all targets can be guaranteed.

The background profile 225/325 may also be determined automatically from the background discriminant values. In this case, $P^j$ may be set to be the identity matrix. As one example, by normalizing (i.e. creating a probability mass function out of) the vector $M_{BG}P^j(X_j)$, where $X_j$ is the training data for target speaker j, and then using it as $W^j$, one can create a similar effect to a "Near Background" profile such as that illustrated in FIG. 4. In addition, one may make modifications to the procedure in order to temper the sensitivity to extremes in the set of background discriminant values with respect to their effect on the automatic weight computation, thus allowing the technique to better match the text conditions. One may, for example, ignore the highest and/or lowest scoring background models in order to increase robustness.

In the above methods, one may replace the training data for speaker j, $X_j$, with the test data for a particular claim, $X_{test}$. In this way, the $P^j$ matrix is calculated independently for each verification test. There is no effect on the weights unless the latter automatic technique is used.

It will be appreciated that contemplated herein are methods for creating an adaptive and stable background population discriminant function using individual discriminants in the population via the use of Enforced (adjustable) and Automatic (adaptive) methods for generating weighting (or, background) profiles to be used in the construction procedure. These techniques help improve system robustness in a number of ways but, particularly, the ability to specify weighting profiles allows one to focus on a consistent background characteristic for all target speakers enrolled. This is accomplished by the combined use of $P^j$ and $W^j$. As the target and background population may contain data from a variety of environments, the adaptive and target specific nature of the profile provides a form of environment normalization.

It is to be understood that the present invention, in accordance with at least one presently preferred embodiment, includes a receiving arrangement which receives an identity claim, a target discriminant generator which determines a target discriminant, a background discriminant generator which determines a background discriminant and a decision arrangement which determines a score based on the target discriminant and the background discriminant, and accepts or rejects the identity claim based on the determined score. Together, the receiving arrangement, target discriminant generator, background discriminant generator, and decision arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing authentication, said method comprising the steps of:
   receiving an identity claim;
   determining a target discriminant based on the identity claim and on at least one target model relating to a target individual;
   determining a background discriminant based on the identity claim and on at least one background model relating to at least one background individual, wherein said step of determining the background discriminant comprises providing a background profile and further determining the background discriminant based on the background profile as a target-dependent function of individual voiceprint-based discriminants in the background profile;
   determining a score based on the target discriminant and the background discriminant; and
   accepting or rejecting the identity claim based on the determined score.

2. The method according to claim 1, wherein said step of providing a background profile comprises:
   determining a permutation matrix;
   determining a weight vector; and
   determining the background profile based on the permutation matrix and the weight vector.

3. The method according to claim 2, wherein said step of determining the weight vector comprises selecting a weight graph that relates the individual background discriminant functions to at least one characteristic associated with the at least one target voiceprint model.

4. The method according to claim 2, wherein said step of providing the background profile comprises providing the background profile automatically.

5. The method according to claim 4, wherein said step of determining the permutation matrix comprises providing the permutation matrix as the identity matrix.

6. The method according to claim 1, further comprising:
providing a plurality of background population models; and
ascertaining individual discriminants in correspondence with each of the background population models;
said step of determining the background discriminant comprising determining the background discriminant as a function of the individual discriminants.

7. The method according to claim 6, wherein said step of determining the background discriminant comprises determining the background discriminant as a function, of the individual discriminants corresponding to each of the background population models, that is dependent on at least one characteristic relating to the target individual.

8. A method of providing speech-based authentication, said method comprising the steps of:
receiving an identity claim;
determining a target discriminant based on the identity claim and on at least one target voiceprint model relating to a target speaker;
determining a background discriminant based on the identity claim and on at least one background voiceprint model relating to at least one background speaker, wherein said step of determining the background discriminant comprises providing a background profile and further determining the background discriminant based on the background profile as a target-dependent function of individual voiceprint-based discriminants in the background profile;
determining a score based on the target discriminant and the background discriminant; and
accepting or rejecting the identity claim based on the determined score.

9. An apparatus for providing authentication, said apparatus comprising:
a receiving arrangement which receives an identity claim;
a target discriminant generator which determines a target discriminant based on the identity claim and on at least one target model relating to a target individual;
a background discriminant generator which determines a background discriminant based on the identity claim and on at least one background model relating to at least one background individual, wherein said step of determining the background discriminant comprises providing a background profile and further determining the background discriminant based on the background profile as a target-dependent function of individual voiceprint-based discriminants in the background profile; and
a decision arrangement which determines a score based on the target discriminant and the background discriminant, and accepts or rejects the identity claim based on the determined score.

10. The apparatus according to claim 9, wherein said background discriminant generator is further adapted to:
determine a permutation matrix;
determine a weight vector; and determine the background profile based on the permutation matrix and the weight vector.

11. The apparatus according to claim 10, wherein said background discriminant generator is adapted to determine the weight vector via selecting a weight graph that relates the individual background discriminant functions to at least one characteristic associated with the at least one target model.

12. The apparatus according to claim 10, wherein said background discriminant generator is adapted to provide the background profile automatically.

13. The apparatus according to claim 12, wherein said background discriminant generator is adapted to provide the permutation matrix as the identity matrix.

14. The apparatus according to claim 9, wherein:
the at least one background population voiceprint model comprises a plurality of background population models; and
said background discriminant generator is adapted to:
ascertain individual discriminants in correspondence with each of the background population models; and
determine the background discriminant as a function of the individual discriminants.

15. The apparatus according to claim 14, wherein said background discriminant generator is further adapted to determine the background discriminant as a function, of the individual discriminants corresponding to each of the background population models, that is dependent on at least one characteristic relating to the target speaker.

16. An apparatus for providing speech-based authentication, said apparatus comprising:
a receiving arrangement which receives an identity claim;
a target discriminant generator which determines a target discriminant based on the identity claim and on at least one target voiceprint model relating to a target speaker;
a background discriminant generator which determines a background discriminant based on the identity claim and on at least one background voiceprint model relating to at least one background speaker, wherein said step of determining the background discriminant comprises providing a background profile and further determining the background discriminant based on the background profile as a target-dependent function of individual voiceprint-based discriminants in the background profile; and
a decision arrangement which determines a score based on the target discriminant and the background discriminant, and accepts or rejects the identity claim based on the determined score.

17. A program storage device readable by machine, tangibly embodying a program of instructions executable by the machine to perform method steps for providing authentication, said method comprising the steps of:
receiving an identity claim;
determining a target discriminant based on the identity claim and on at least one target voiceprint model relating to a target individual;
determining a background discriminant based on the identity claim and on at least one background model relating to at least one background individual, wherein said step of determining the background discriminant comprises providing a background profile and further determining the background discriminant based on the background profile as a target-dependent function of individual voiceprint-based discriminants in the background profile;
determining a score based on the target discriminant and the background discriminant; and
accepting or rejecting the identity claim based on the determined score.

* * * * *